United States Patent [19]

Oneto et al.

[11] Patent Number: 5,588,134
[45] Date of Patent: Dec. 24, 1996

[54] SYSTEM FOR ESTABLISHING PRIORITY AMONG SELECTED TASKS BASED ON LOCATION OF TASKS AND SEQUENCE THAT THE TASKS WERE STORED WHEREAS TASK IS ALWAYS STORED IN LOCATION WITH THE LOWEST AVAILABLE ADDRESS

[75] Inventors: John C. Oneto, Campbell; Stephen P. Russell, Morgan Hill, both of Calif.

[73] Assignee: Amdahl Corporation, Sunnyvale, Calif.

[21] Appl. No.: 951,387

[22] Filed: Sep. 25, 1992

[51] Int. Cl.[6] .............................. G06F 7/00; G06F 7/04; G06F 13/34

[52] U.S. Cl. ...................... 395/485; 395/427; 395/478; 395/481; 395/732

[58] Field of Search ........................... 364/200; 395/275, 395/650, 425, 427, 478, 481, 485

[56] References Cited

U.S. PATENT DOCUMENTS

| | | | |
|---|---|---|---|
| 3,350,694 | 10/1967 | Kusnick et al. | 340/172.5 |
| 3,623,006 | 11/1971 | Balakian et al. | 340/172.5 |
| 4,533,994 | 8/1985 | Harrill et al. | 364/200 |
| 4,633,394 | 12/1986 | Georgiou et al. | 364/200 |
| 4,658,351 | 4/1987 | Teng | 364/200 |
| 4,763,122 | 8/1988 | Franaszek | 340/825.51 |
| 4,796,178 | 1/1989 | Jennings et al. | 364/200 |
| 4,901,232 | 2/1990 | Harrington et al. | 364/200 |
| 5,179,688 | 1/1993 | Brown et al. | 395/425 |
| 5,220,653 | 6/1993 | Miro | 395/275 |
| 5,327,557 | 7/1994 | Emmond | 395/650 |
| 5,341,473 | 8/1994 | Takayama | 395/200 |

FOREIGN PATENT DOCUMENTS 1246664   10/1989   Japan   ............................. G06F 15/21

*Primary Examiner*—Thomas C. Lee
*Assistant Examiner*—Rehana P. Krick
*Attorney, Agent, or Firm*—Fliesler, Dubb, Meyer & Lovejoy

[57] ABSTRACT

In a system having a plurality of sources for generating tasks and a plurality of receivers for receiving said tasks wherein a plurality of said tasks for one or more said receivers may be generated at the same time by one or more of said sources, each said receiver having a unique address within said system, an apparatus comprising a storage means for storing said tasks generated by said sources; an address means for generating, in each system cycle, the address of one of said receivers; and priority means connected to said address means and said storage means for establishing priority among the tasks for the receiver whose address is being generated by said address means and for generating a signal indicating which said task has priority, where said priority is established as a function of said selected tasks location in said storage means and the sequence that said selected tasks were stored in said storage means.

20 Claims, 5 Drawing Sheets

SYSTEM FOR ESTABLISHING PRIORITY AMONG SELECTED TASKS BASED ON LOCATION OF TASKS AND SEQUENCE THAT THE TASKS WERE STORED WHEREAS TASK IS ALWAYS STORED IN LOCATION WITH THE LOWEST AVAILABLE ADDRESS

BACKGROUND

1. Field of the Invention

The present invention relates to a system for establishing priority among a plurality of tasks stored within a queue.

2. Description of the Related Art

Within multiprocessor systems there is a need to control the assignment of tasks being generated by the various processors within the system. It is common for such systems to have a plurality of I/O channels over which tasks are communicated to various components of the system. Further, there may be a plurality of tasks waiting to be communicated over each of the I/O channels.

In some systems the number of I/O channels may be large such that the I/O channels are grouped together. Each group of I/O channels has a distinct group address and each I/O channel designated as a member of a group has a distinct member address within the group. Thus the individual I/O address is the combination of the group address and the member address for that I/O channel. The system therefore has the option of addressing I/O channels on a group basis, on an individual basis or on the basis of some combination of the group and member address for the I/O channels. Many approaches have been used to systematically service the plurality of tasks generated for a plurality of I/O channels or group of I/O channels.

Queues are used to store the tasks generated by the various components of the multiprocessor system. In one approach, the queue is a first in first out (FIFO) queue which will present the tasks in the order the tasks were received by the queue. However, a disadvantage of such an approach is that a plurality of tasks for one I/O channel might be consecutively stored by the queue causing the other I/O channels not to be serviced until all of the tasks for that one I/O channel have been serviced.

Another common approach is the use of a last in first out LIFO queue which allows the last task entered into the queue to be the next task assigned out of the queue. This approach has the obvious disadvantage that tasks stored earlier in the queue may not be serviced for a long period of time. This approach also has the disadvantages associated with the FIFO queue in that consecutive tasks can be stored for the same I/O channel therefore barring service to the other I/O channels within the system until those consecutive tasks are serviced.

Another approach is the assignment of a priority to tasks based on the function of the task. With this approach there is no assurance that tasks having low priority will ever be serviced.

Therefore, there is a need to have a priority system to assure that each of the I/O channels will be serviced and that each task for each I/O channel will be serviced in a timely fashion. Another requirement for such a priority system is to have the priority system perform this task while using a minimum amount of logic.

SUMMARY OF THE INVENTION

Accordingly, it is an object of the present invention to provide a system which provides equal access to each I/O channel for servicing tasks generated for that I/O channel.

It is another object of the invention to provide a system for establishing priority among the tasks assigned to a specific I/O channel or group of I/O channels to ensure that each task will be serviced in a timely fashion.

It is still another object of the invention to provide a priority system which employs a minimum of logic to perform the system function.

The system is comprised of a queue having a plurality of stages where each stage has a register to store a task generated by a component of the system. The system also stores in the register the address of the I/O channel to be used and a valid data bit to indicate that a task requesting service is stored in that stage within the queue. A counter cyclically, sequentially generates the addresses of the I/O channels or groups of I/O channels. Each stage includes a comparator for generating a compare signal whenever the address generated by the counter is the same as the address stored in the register within the stage. During a system cycle, more than one stage within the queue may store the same I/O channel or I/O channel group address and a valid data bit. The system includes priority logic to determine which stage is to be serviced during each system cycle based on the position of the stage in the queue, the past history as to when a task was first stored into a stage in the queue, and the I/O channel address or group address assigned to the task stored in each of the stages. The number of stages in the queue is dependent upon the task request rate that is expected to be generated by the system. When a task is loaded into the queue, it is loaded into the stage within the queue that has the lowest stage address which does not have a valid data bit stored within the stage, i.e. no current task stored in the stage requesting service for any I/O channel.

This system provides a means to ensure that each I/O channel or group of I/O channels is serviced and further generates priority among tasks assigned to the same I/O channel or groups of I/O channels. Further, the system, in employing a single queue for servicing all I/O channels, minimizes the logic necessary to perform the system functions.

BRIEF DESCRIPTION OF THE DRAWINGS.

The invention will be described with respect to particular embodiments thereof and reference will be made to the drawings, in which.

DETAILED DESCRIPTION OF THE PREFERRED EMBODIMENTS

Figure 1:
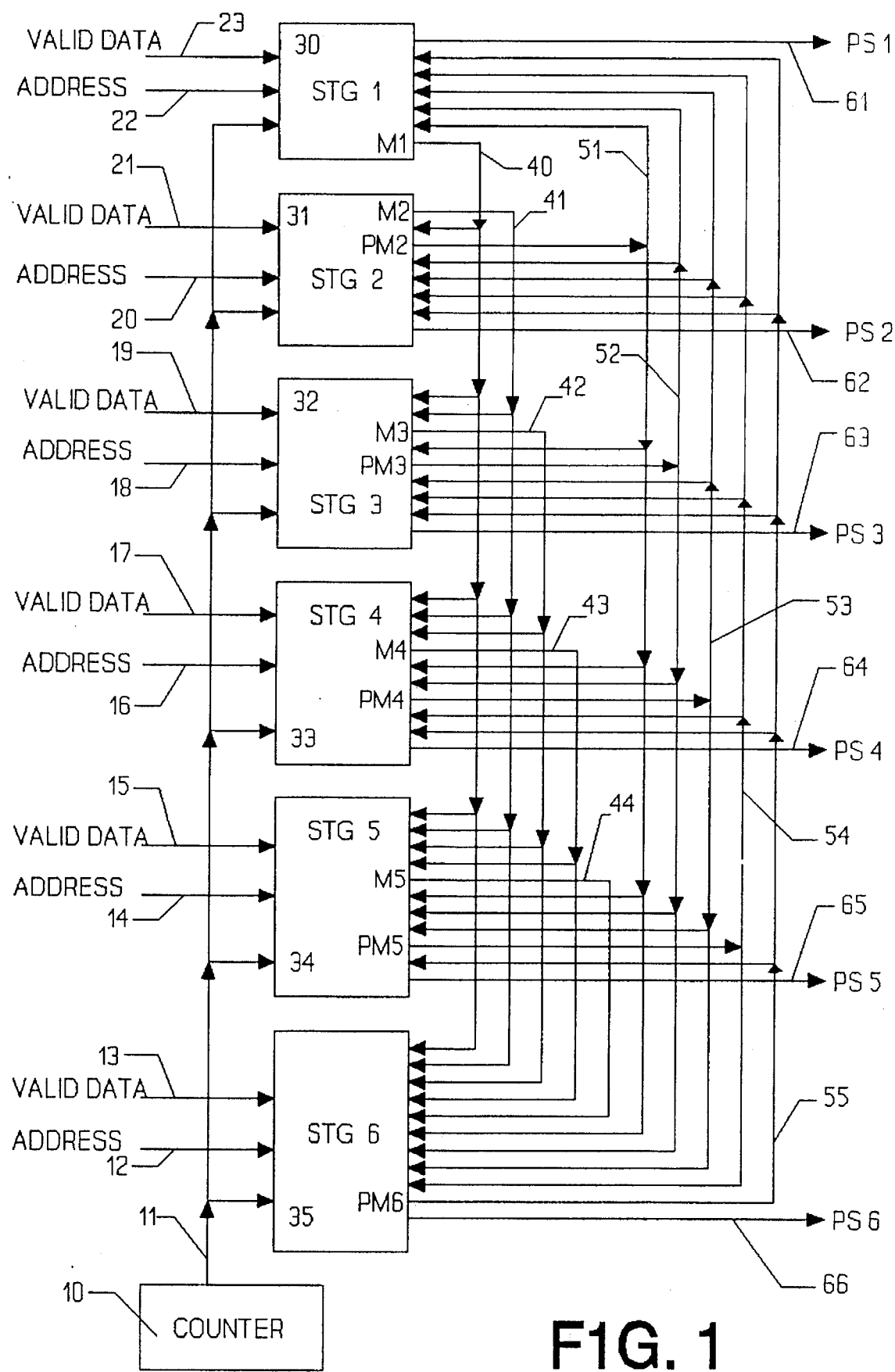
FIG. 1 is a logic diagram of the priority system.

Referring to FIG. 1, the system is comprised of a queue having six stages 30, 31, 32, 33, 34 and 35 and a counter 10 which is stepped each system cycle. Six groups of I/O channels are used having group addresses 0 to 5. Counter 10 will cyclically count from 0 to 5 and will toggle an additional bit within counter 10 each time the counter 10 is reset to zero. The combination of the group address and the value of the toggled bit of the counter 10 generates twelve select addresses for counter 10, one address each system cycle. The I/O channel address has a group I/O channel address and a member I/O channel address. In this system the low order bit of the member I/O channel address is used in conjunction with the group I/O channel address to form the I/O channel select address. Each I/O channel select address will be generated by counter 10 every twelfth system cycle. The value of counter 10 is provided to each stage 30, 31, 32, 33, 34 and 35 by line 11. The first stage 30 stores the complete I/O channel address on line 22, the valid data bit on line 23 and other task data. In similar fashion, the second stage 31 stores the valid data bit on line 21 and the complete I/O channel address on line 20, the third stage 32 stores the valid data bit on line 19 and the complete I/O channel address on line 18, the fourth stage 33 stores the valid data bit on line 17 and the complete I/O channel address on line 16, the fifth stage 34 stores the valid data bit on line 15 and the complete I/O channel address on line 14 and the sixth stage 35 stores the valid data bit on line 13 and the complete I/O channel address on line 12. Each stage generates a provide status signal PS, a match signal M and a priority match signal PM. Only one stage during each system cycle can generate a provide status signal PS.

A match signal M is generated by a stage when the stage contains both a valid data bit and when the group I/O channel address and the low order bit of the member I/O channel address matches the I/O channel select address generated by counter 10. A provide status signal PS is generated by a stage when either (1) a match signal is generated by that stage, no stage having a higher queue address generated a priority match signal PM and no stage having a lower queue address has generated a match signal M or (2) the stage generates a priority match signal PM and no stage having a lower queue address has generated a priority match signal PM.

The priority match signal PM is generated by a stage when the match signal M for that stage has been generated and the priority latch associated with that stage is set.

The priority latch for a stage is set when a match signal M for the stage is generated, no stage having a higher queue address generates a priority match signal PM and no provide status signal PS has been generated by the stage. The priority latch for a stage is reset when the stage generates a provide status signal PS.

In a system having a six stage priority queue and twelve I/O select channel addresses, the maximum length of time that a task, once stored in the queue, will have to wait to be serviced is 96 system cycles, assuming that status is accepted when presented.

The first stage 30 provides a match signal M1 on line 40 to stages 31, 32, 33, 34 and 35 and a provide status signal PS1 on line 61. The second stage 31 provides a match signal M2 on line 41 to stages 32, 33, 34 and 35 and a priority match signal PM2 on line 51 to stages 30, 32, 33, 34 and 35 and a provide status signal PS2 on line 62. The third stage 32 provides a provide status signal PS3 on line 63, a match signal M3 on line 42 to stages 33, 34 and 35 and a priority match signal PM3 on line 52 to stages 30, 31, 33, 34 and 35. The fourth stage 33 provides a provide status signal PS4 on line 64, a match signal M4 on line 43 to stages 34 and 35 and a priority match signal PM4 on line 53 to stages 30, 31, 32, 33 and 35. The fifth stage 34 provides a provide status signal PS5 on line 65, a match signal M5 on line 44 to stage 35 and a priority match signal PM5 on line 54 to stages 30, 31, 32, 33 and 35. The sixth stage 35 provides a provide status signal PS6 on line 66 and a priority match signal PM6 on line 55 to stages 30, 31, 32, 33 and 34.

The above interconnection of the stages allow the logic in each stage to perform the function of determining whether to generate a provide status signal PS, a match signal M, a priority match signal PM and whether to set or reset the priority latch for each system cycle.

Figure 2:
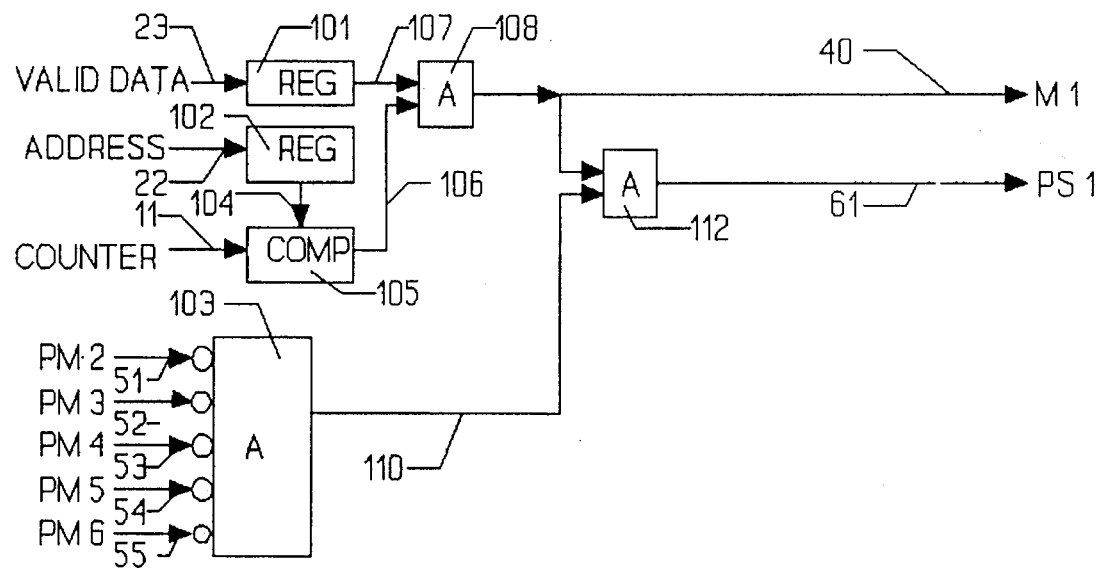
FIG. 2 is a logic diagram of the first queue stage.

Referring to FIG. 2, the logic of the first stage 30 of the queue is shown. Register 101 stores the valid data bit and register 102 stores the complete I/O channel address. Comparator 105 receives a I/O channel select address from counter 10 on line 11 and compares that to the group I/O channel address and the low order bit of the member I/O channel address contained in register 102 on line 104. When a match occurs comparator 105 generates a compare signal on line 106. AND 108 will be conditioned when a compare signal is sensed on line 106 and a data valid bit is sensed on line 107 and when conditioned will generate a match signal M1 on line 40. The output of AND 108 also is an input to AND 112. AND 103 will be conditioned when all priority match signals PM2, PM3, PM4, PM5 and PM6 are not generated. AND 112 is conditioned when a match signal M1 appears on line 40 and AND 103 is conditioned. When AND 112 is conditioned, AND 112 generates a provide status signal PS1 on line 61. There is no need for a priority latch in first stage 30 or for the first stage 30 to generate a priority match signal PM1.

Figure 3:
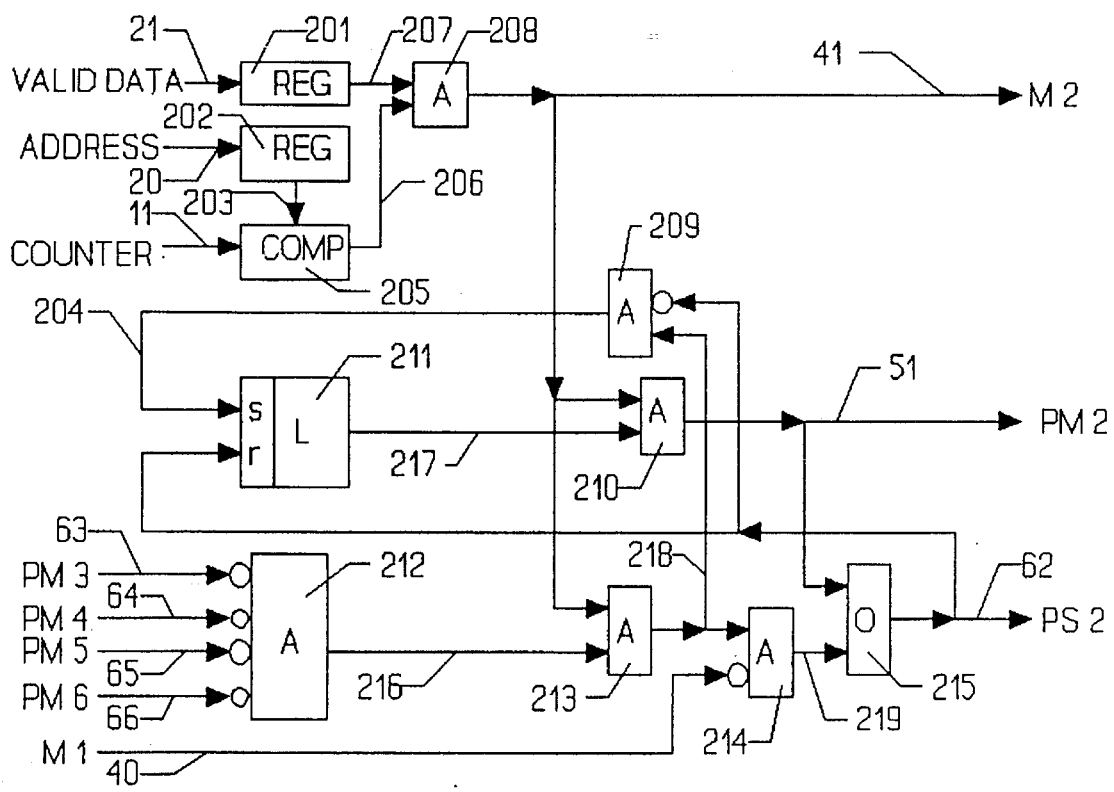
FIG. 3 is a logic diagram of the second queue stage.

Referring to FIG. 3, the logic of the second stage 31 is shown. Again, a comparator 205 is used to compare the I/O channel select address generated by counter 10 with the group I/O channel address and low order bit of the member I/O channel address stored in register 202. When a compare occurs and valid data bit is stored in register 201, AND 208 will be conditioned and when conditioned will generate a match signal M2 on line 41. AND 212 will be conditioned when all of the priority match signals PM3, PM4, PM5 and PM6 are not being generated. AND 213 will be conditioned when both AND 212 and AND 208 are conditioned. AND 214 is conditioned when AND 213 is conditioned and a match signal M1 is not generated on line 40. When priority latch 211 is set and a match signal M2 is present on line 41, AND 210 is conditioned and when conditioned will generate a priority match signal PM2 on line 51. When either AND 214 or AND 210 is conditioned, OR 215 is conditioned and when conditioned will generate a provide status signal PS2 on line 62. Whenever a provide status signal PS2 appears on line 62, priority latch 211 is reset by the next signal that steps counter 10. AND 209 is conditioned when AND 213 is conditioned and OR 215 is not conditioned. When AND 209 is conditioned priority latch 211 will be set.

Figure 4:
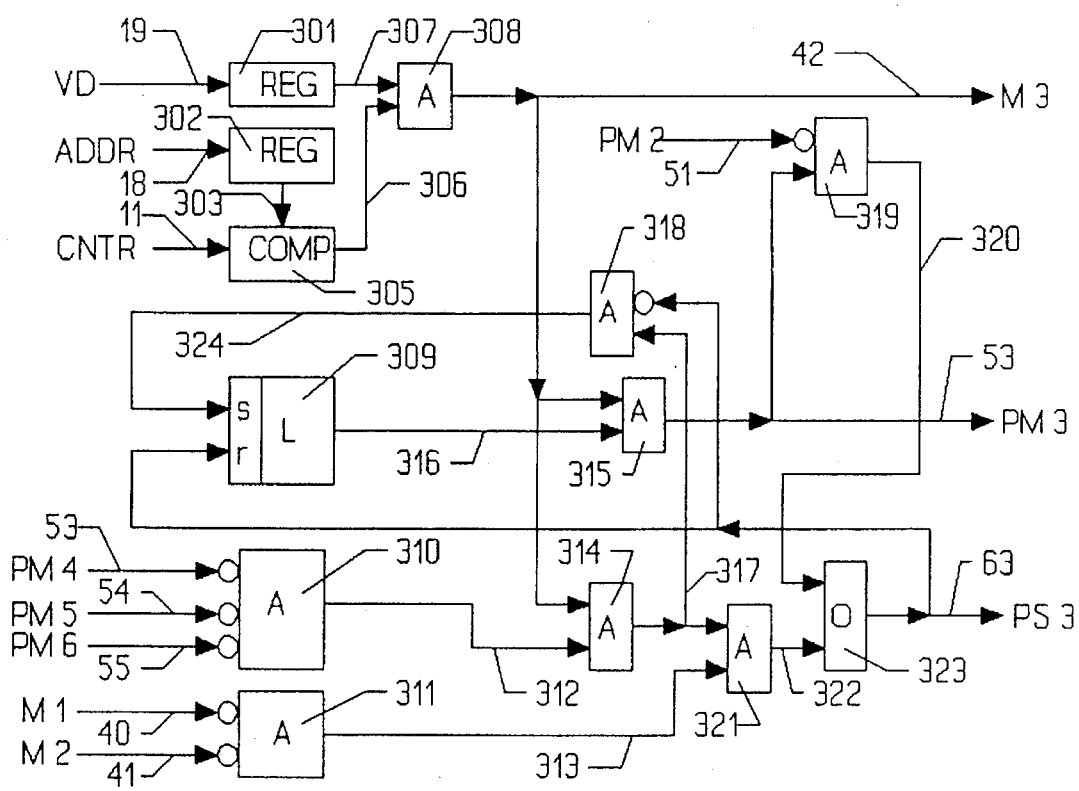
FIG. 4 is a logic diagram of the third queue stage.

Referring to FIG. 4, the logic for the third stage 32 is shown. A comparator 305 compares the I/O channel address generated by counter 10 on line 11 with the group I/O channel address and the low order bit of the member I/O channel address stored in register 302 on line 303. When a valid data bit is stored in register 301 and a match is sensed by comparator 305, AND 308 is conditioned and generates a match signal M3 on line 42. When all priority match signals PM4, PM5 and PM6 are not generated, AND 310 will be conditioned. When both match signals M1 and M2 are not generated, AND 311 is conditioned. When a match signal M3 is generated on line 42 and AND 310 is conditioned, AND 314 will be conditioned. When AND 314 and AND 311 are both conditioned, AND 321 will be conditioned. When priority latch 309 is set and a match signal M3 appears on line 42, AND 315 will be conditioned and when conditioned will generate a priority match signal PM3. When a priority match signal PM2 is not generated and AND 315 is conditioned, AND 319 will be conditioned. When either AND 319 or AND 321 is conditioned, OR 323 is conditioned and when conditioned will generate a provide status signal PS3 on line 63. A provide status signal PS3 on line 63 will reset priority latch 309. When AND 314 is conditioned and OR 323 is not conditioned, AND 318 will be conditioned allowing priority latch 309 to be set.

Figure 5:
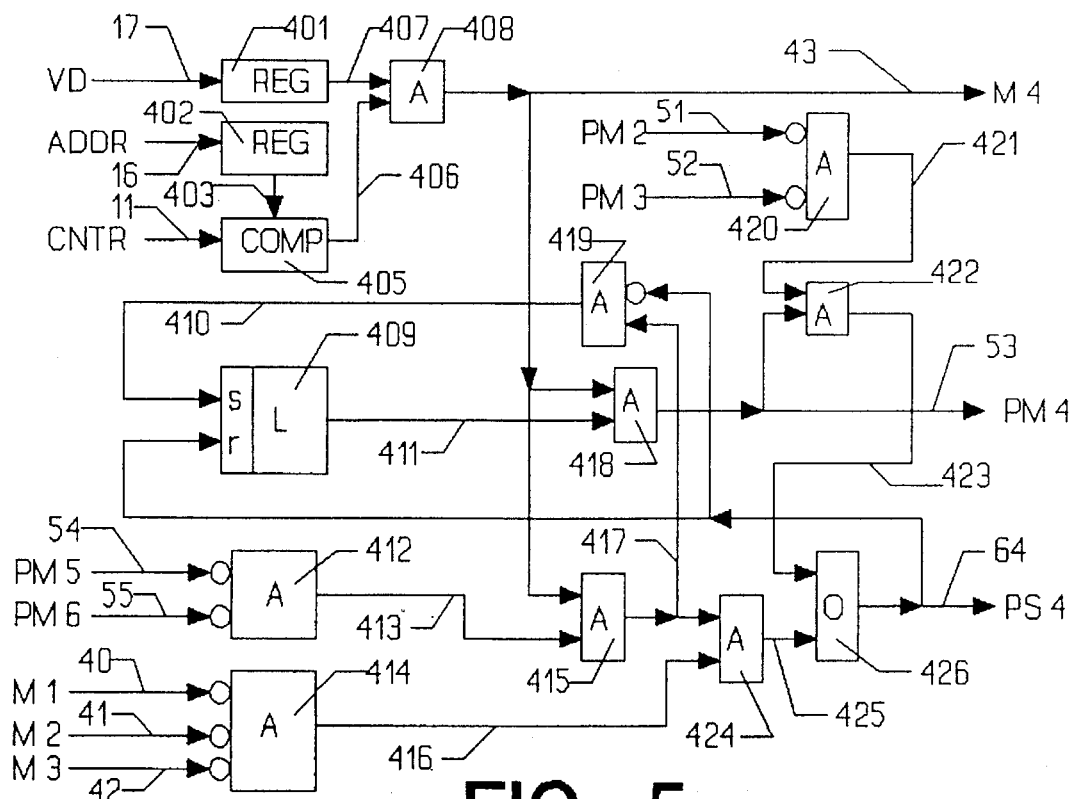
FIG. 5 is a logic diagram of the fourth queue stage.

Referring to FIG. 5, the logic for the fourth stage 33 is shown. A match signal M4 will be generated on line 43 by AND 408 when comparator 405 indicates a match between the I/O channel select address generated by counter 10 and the group I/O channel address and the low order bit of the member I/O channel address stored in register 402 and a valid data bit is stored in register 401. AND 412 is conditioned when both priority match signals PM5 and PM6 are not generated. AND 414 is conditioned when all match signals M1, M2 and M3 are not generated. And 415 is conditioned when AND 412 is conditioned and a match signal M4 appears on line 43. AND 424 is conditioned when AND 415 and AND 414 are both conditioned. AND 418 is conditioned when priority latch 409 is set and a match signal M4 appears on line 43 and when conditioned will generate a priority match signal PM4 on line 53. AND 420 is conditioned when both priority match signals PM2 and PM3 are not generated. AND 422 is conditioned when both AND 420 and AND 418 are conditioned. When either AND 422 or AND 424 is conditioned, OR 426 will be conditioned and when conditioned will generate a provide status signal PS4 on line 64. A provide status signal PS4 on line 64 will reset priority latch 409. AND 419 is conditioned when AND 415 is conditioned and OR 426 is not conditioned. Priority latch 409 will be set when AND 419 is conditioned.

Figure 6:
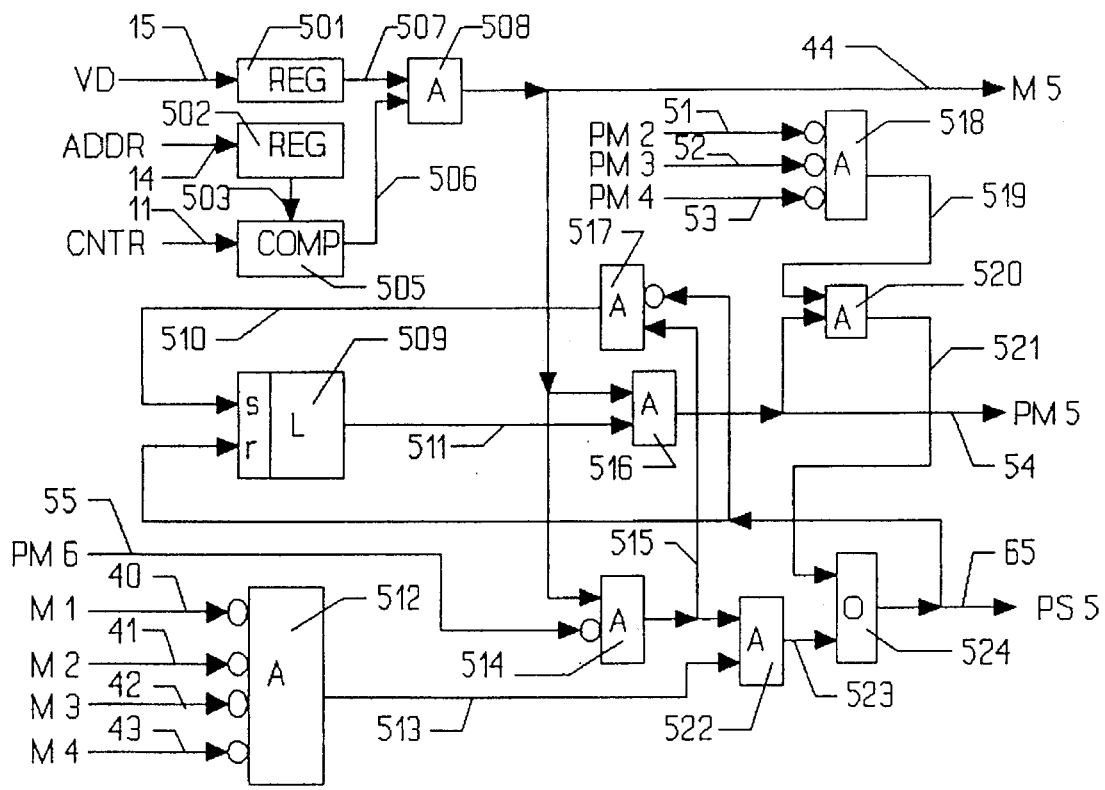
FIG. 6 is a logic diagram of the fifth queue stage.

Referring to FIG. 6, the logic for the fifth stage 34 is shown. A match signal M5 will be generated on line 44 when AND 508 is conditioned. AND 508 is conditioned when both a valid data bit is stored in register 501 and a match between the I/O channel select address generated by counter 10 and the group I/O channel address and the low order bit of the member I/O address stored in register 502 is sensed by comparator 505. AND 514 is conditioned when a match signal M5 appears on line 44 and a priority match signal PM6 is not generated on line 55. AND 512 is conditioned when all match signals M1, M2, M3 and M4 are not generated. AND 522 is conditioned when both AND 512 and 514 are conditioned. AND 516 is conditioned when priority latch 509 is set and a match signal M5 appears on line 44 and when conditioned will generate a priority match signal PM5 on line 54. AND 518 is conditioned when all priority match signals PM2, PM3 and PM4 are not generated. AND 520 is conditioned when both AND 518 and AND 516 are conditioned. OR 524 is conditioned when either AND 520 or AND 522 is conditioned and when OR 524 is conditioned OR 524 will generate a provide status signal PS5 on line 65. A provide status signal PS5 on line 65 will reset priority latch 509. Priority latch 509 is set when AND 517 is conditioned. AND 517 is conditioned when both AND 514 is conditioned and OR 524 is not conditioned.

Figure 7:
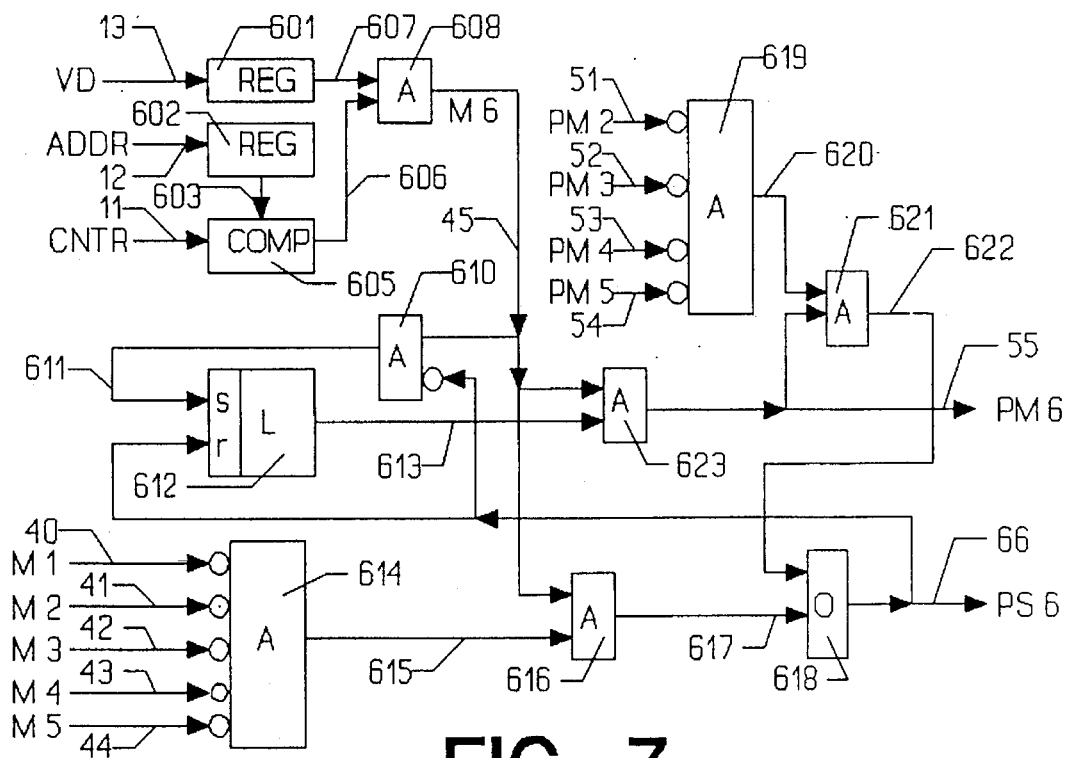
FIG. 7 is a logic diagram of the sixth queue stage.

Referring to FIG. 7, the logic for the sixth stage 35 is shown. A match signal M6 is generated on line 45 whenever AND 608 is conditioned. AND 608 is conditioned when both a valid data bit is stored in register 601 and a match is sensed by comparator 605 between the I/O channel select address generated by counter 10 and the group I/O channel address and the low order bit of the member I/O channel address stored in register 602. AND 614 is conditioned when all match signals M1, M2, M3, M4 and M5 are not generated. AND 616 will be conditioned when a match signal M6 appears on line 45 and AND 614 is conditioned. When priority latch 612 is set and a match signal M6 appears on line 45, AND 623 is conditioned and when conditioned generates a priority match signal PM6 on line 55. AND 619 is conditioned when all priority match signal PM2, PM3, PM4 and PM5 are not generated. When AND 619 and AND 623 are both conditioned, AND 621 is conditioned. When either AND 616 or AND 621 is conditioned, OR 618 is conditioned and when conditioned will generate a provide status signal PS6 on line 66. Whenever a provide status signal PS6 appears on line 66, priority latch 612 will be reset. Priority latch 612 will be set when AND 610 is conditioned. AND circuit 610 will be conditioned when a match signal M6 appears on line 45 and OR 618 is not conditioned.

Priority between competing priority match signals is given to the stage having the lowest queue address. Priority between competing match signals, when no priority match signal has been generated by any other stage, is given to the stage that has the lowest queue address.

The stage is not cleared until the provide status signal PS is accepted by the I/O channel processor. If status is not accepted, the contents of the stage remain unchanged. If status is accepted, then the valid data bit of the stage is cleared which indicates that the stage is available to receive a new task. Whenever the system is loading a task into the queue, the system will always load the task into the stage that has the lowest empty queue address.

Figure 8:
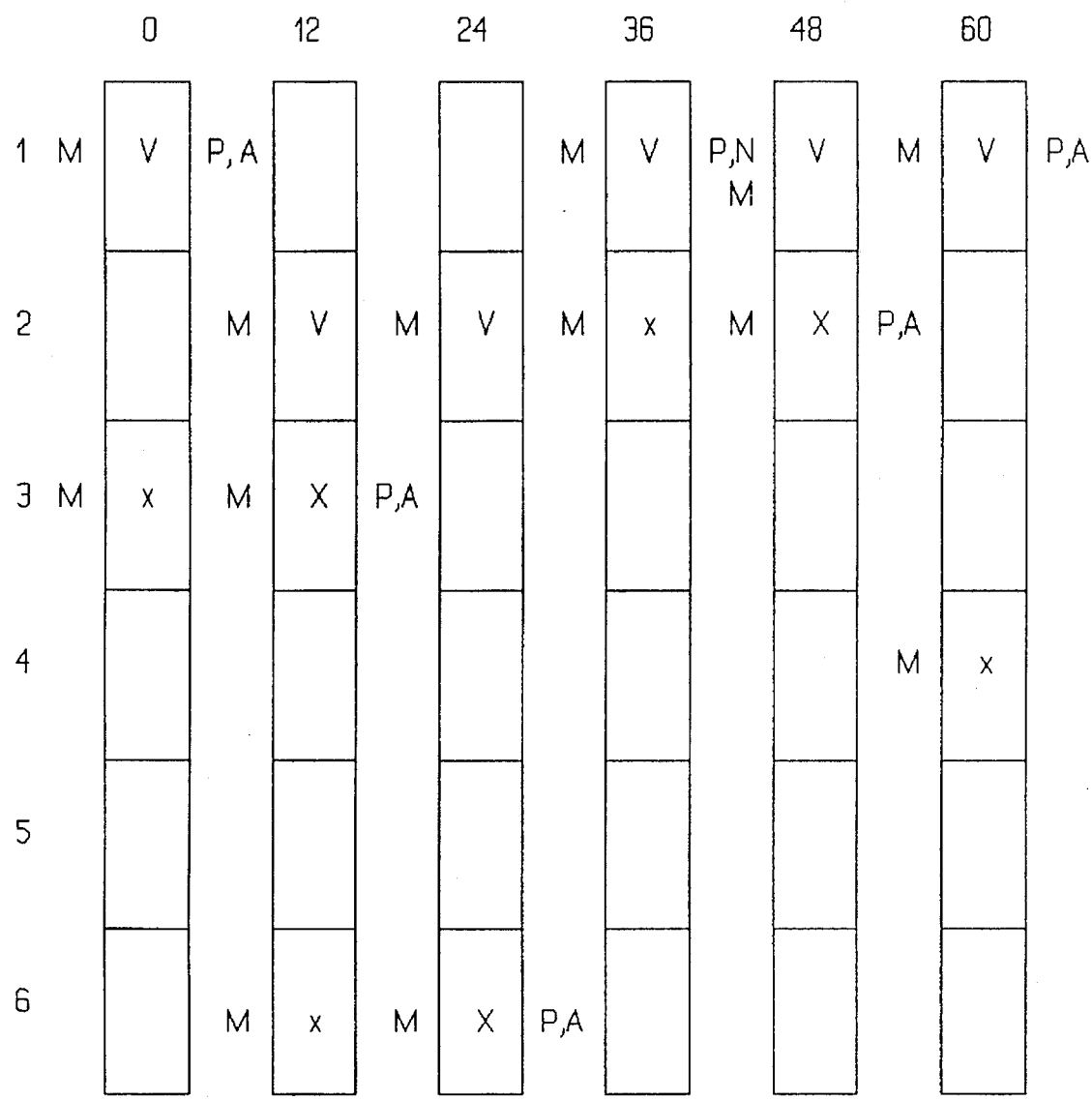
FIG. 8 is a table illustrating the method for selecting which stage has priority for the same I/O channel.

The operation of the system will be explained referring to FIG. 8. FIG. 8 shows down the left side the queue address of the stage and across the top the system cycle number. The figure describes the priority system for one of the twelve I/O channel select addresses. A blank stage indicates that either the stage is empty or the stage has valid data but has an I/O channel select address other than the I/O channel select address being used in this example. Since there are twelve I/O channel select addresses, a given I/O channel select address will be addressed by counter 10 every twelfth cycle and the stages having valid data for the presently addressed channel select address will be tested to ascertain which stage will be given priority.

At cycle 0 both the first and third stages have stored a valid data bit. Assuming that no priority latches have been set in the previous cycle, the first stage 30 will generate a provide status signal PS1. The third stage 32 will set the priority latch 309 because AND 314 is conditioned and OR 323 is not conditioned. Thus, during cycle 0, the first stage generated a provide status signal PS1 and in response thereto status is assumed to be accepted and the priority latch for the third stage was set. The I/O channel processor when evaluating status will obtain and use the complete I/O channel address stored in the stage generating the provide status signal PS.

At cycle 12, a match signal M is generated for the second stage 31, the third stage 32 and the sixth stage 35. Since the third stage 32 has a match signal M3 on line 42 and its priority latch 309 has been set in the previous cycle, the third stage will generate a provide status signal PS3 on line 63. The second stage 31 AND 212 will be deconditioned thereby preventing priority latch 211 from being set. The sixth stage will have ANDs 616 and 621 deconditioned therefore causing OR 618 to be deconditioned. Since a match signal M6 will appear on line 45, AND 610 will be conditioned allowing priority latch 612 to be set during this cycle of operation. In summary, during this cycle of operation, a provide status signal PS3 was generated for the third stage, the priority latch was set for the sixth stage and the second stage still has a match condition but the priority latch was not set.

At cycle 24, a match signal M will be generated by the second stage 31 and the sixth stage 35. Again, the priority latch for the second stage 31 is not set because AND 209 is not conditioned. Since the priority latch 612 for the sixth stage 35 was previously set and a match signal M6 appears on line 45, AND 623 will be conditioned. AND 619 will be conditioned since no lower address stage has generated a priority match signal. AND 621 is conditioned and generates a provide status signal PS6 on line 66. The appearance of the provide status signal PS6 on line 66 will clear priority latch 612. Again, assuming that status is accepted by the I/O channel processor, the valid data bit will be cleared and the sixth stage will be available to receive another task.

At cycle 36, a match signal M is generated for the first stage 30 and the second stage 31. Since no priority match signals have been generated by any higher address stages than the first stage 30, the first stage 30 will generate a provide status signal PS1 on line 61. The second stage 31 having a match signal M2 and AND 209 being conditioned, priority latch 211 will be set during this cycle.

At cycle 48, assuming that status for the first stage 30 was not accepted by the I/O channel, the contents of the first stage 30 will remain the same. A match signal M will be generated for the first stage 30 and the second stage 31. However, at this time, since the second stage has its priority latch 211 set, it will generate a priority match signal PM2 on line 51 which will prevent the first stage 30 from generating a provide status signal PS1 on line 61. In that the second stage 31 has a match signal M2 on line 41 and its priority latch 211 set, AND 210 will be conditioned which in turn will condition OR 215. OR 215 being conditioned generates a provide status signal PS2 on line 62 and will reset priority latch 211.

At cycle 60, assuming that status for the second stage 31 has been accepted by the I/O channel processor, a match signal M will be generated by the first stage 30 and the fourth stage 33. At this time the first stage 30 will generate a provide status signal PS1 on line 61 since no other stage has generated a priority match signal. The fourth stage 34 will have a match signal M4 on line 43. AND 412 will be conditioned because there are no priority match signals generated by the fifth and sixth stages. AND 415 will be conditioned. AND 414 will be deconditioned because match signal M1 is being generated and this state will cause AND 424 to be deconditioned. Priority latch 409 is not set thereby causing ANDs 418 and 422 to be deconditioned which will cause OR 426 to be deconditioned. This will allow AND 419 to be conditioned which will cause priority latch 409 to be set. Therefore, during this cycle of operation, a provide status signal PS1 is generated for the first stage 30 and priority latch 409 is set for the fourth stage 33. This condition will result in a provide status signal PS4 being generated during cycle 72.

As can be seen from the foregoing examples, where no priority matches exist during the cycle, the lowest address stage generating a match signal M will generate a provide status signal PS. Further, when more than one priority match signal PM is generated in any given cycle, the stage having the lowest queue address generating a priority match signal PM will generate a provide status signal PS. Further, during a cycle of operation, if two or more matches should occur in addition to a priority match signal PM being generated for another stage, the priority latches for all such stages having a higher queue address then the address of the highest address stage generating a priority match signal PM will be set. This is done to prevent the lower address queue stages from locking out service to the higher addressed queue stages.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. In a system having a plurality of sources for generating tasks and a plurality of receivers for receiving said tasks wherein a plurality of said tasks for one or more said receivers may be generated at the same time by one or more of said sources, each said receiver having a unique address within said system, an apparatus comprising:

storage means for storing said tasks generated by said sources into addressed locations within said storage means where a task when received by said storage means is always stored in a location which has the lowest address in said storage means and which is available to accept a task;

address means for generating, in each system cycle, the address of one of said receivers; and priority means connected to said address means and said storage means for establishing priority among selected tasks, said selected tasks being those tasks for receiver whose address is being generated by said address means, and for generating a signal indicating which task of said selected tasks has priority, where said priority is established as a function of said selected tasks' location in said storage means and the sequence that said selected tasks were stored in said storage means.

2. The apparatus claim 1 wherein said address means comprises:

cyclic means for sequentially generating the address of each said receiver every nth system cycle, where n is equal to the number of said receivers.

3. In a system having a plurality of sources for generating tasks and a plurality of receivers for receiving said tasks wherein a plurality of said tasks for one or more said receivers may be generated at the same time by one or more of said sources, each said receiver having a unique address within said system, an apparatus comprising:

storage means for storing said tasks generated by said sources into addressed locations within said storage means where a task when received by said storage means is always stored in a location which has the lowest address in said storage means and which is available to accept a task, said storage means comprises:

a queue having m stages, where each stage has a unique address of 1 to m and stores (1) a task, (2) the address of a said receiver to receive said task and (3) a marker indicating that said stored task has not yet been received by said receiver and that said stage is not available to accept a new task received by said storage means;

address means for generating, in each system cycle, the address of one of said receivers; and priority means connected to said address means and said storage means for establishing priority among selected tasks, said selected tasks being those tasks for the receiver whose address is being generated by said address means, and for generating a signal indicating which task of said selected tasks has priority, where said priority is established as a function of said selected tasks' location in said storage means and the sequence that said selected tasks were stored in said storage means.

4. The apparatus of claim 3 wherein each of said stages includes:

match means for generating a match signal when said stage has stored therein both an address equal to the address generated by said address means and a marker;

priority match means for generating a priority match signal for a stage; and provide status means for generating a provide status signal for a stage when a match signal is generated for said stage and said stage has the highest priority.

5. The apparatus of claim 4 wherein each said stage of said match means comprises:

comparator means for generating a compare signal when the receiver address generated by said address means is equal to the receiver address stored in said stage.

6. The apparatus of claim 5 wherein each said match means further comprises:

match signal means for generating a match signal when said comparator means generates a compare signal and a marker is stored in said stage.

7. The apparatus of claim 4 wherein said priority match means comprises:

a priority latch; and priority match signal means for generating a priority match signal when said match means generates a match signal and said priority latch is set.

8. The apparatus of claim 7 wherein said priority match means further comprises:

setting means for setting the priority latch for a stage when no stage, having a higher stage address than said stage, generates a priority match signal, a match signal is generated by said stage and a provide status signal is not generated by said stage; and resetting means for resetting the priority latch for said stage when a present match provide status signal is generated by said stage.

9. The apparatus of claim 4 wherein said provide status means comprises:

provide status signal means for generating a provide status signal for said stage when either (1) a priority match signal is generated for said stage and no priority match signal is generated by any stage having a lower stage address than said stage or (2) when a match signal is generated by said stage, no match signal is generated by any stage having a lower address than said stage and no priority match signal is generated by any stage having a higher stage address than said stage.

10. In a system having a plurality of sources for generating tasks and a plurality of receivers for receiving said tasks wherein a plurality of said tasks for one or more said receivers may be generated at the same time by one or more of said sources, each said receiver having a unique address within said system, said system having a queue having a plurality of stages, each said stage having a priority latch and means for storing a task, the address of the receiver to receive the task and a marker indicating that the stored task has not been received by said receiver whose address is stored in said means, said system further having address means for generating the addresses of said receivers, a method for establishing priority among said task for each of said receivers during each system cycle comprising the steps of:

storing a task when received by said apparatus into a stage of said queue which has the lowest address in said queue and which is available to accept a task;

generating a match signal for a stage when said stage has stored therein both an address equal to the address generated by said address means and a marker;

generating a priority match signal for a stage when said priority latch for said stage has been set and a match signal has been generated by said stage; and generating a provide status signal for a stage when either (1) a priority match signal is generated by said stage and no priority match signal is generated by any stage having a lower stage address than said stage or (2) a match signal is generated by said stage, no match signal is generated for any stage having a lower stage address than said stage and no priority match signal is generated by any stage having a higher stage address than said stage.

11. The method of claim 10 further comprising the steps of:

setting the priority latch for a stage when no priority match signal is generated by any stage having a higher stage address than said stage, a match signal is generated by said stage and a provide status signal is not generated by said stage; and resetting said priority latch for a stage when a provide status signal is generated by said stage.

12. In a system having a plurality of sources for generating tasks and a plurality of receivers for receiving said tasks wherein a plurality of said tasks for one or more said receivers may be generated at the same time by one or more of said sources, said receivers being grouped together such that each receiver has a unique address comprised of a group address and a member address, an apparatus comprising:

storage means for storing said tasks generated by said sources into addressed locations within said storage means where a task when received by said storage means is always stored in a location which has the lowest address in said storage means and which is available to accept a task;

address means for generating for each system cycle a select address of one or more said receivers within a group of said receivers; and priority means connected to said address means and said storage means for establishing priority among selected tasks, said selected tasks being those tasks for the receivers whose address compares with said selected addresses being generated by said address means, and for generating a signal indicating which task of said selected tasks has priority, where said priority is established as a function of said selected tasks' position in said storage unit and the sequence said selected tasks were stored in said storage unit.

13. The apparatus of claim 12 wherein said address means comprises:

cyclic means for sequentially generating each said select address every nth system cycle, where n is equal to the number of said select addresses generated by said address means.

14. In a system having a plurality of sources for generating tasks and a plurality of receivers for receiving said tasks wherein a plurality of said tasks for one or more said receivers may be generated at the same time by one or more of said sources, said receivers being grouped together such that each receiver has a unique address comprised of a group address and a member address, an apparatus comprising:

storage means for storing said tasks generated by said sources into addressed locations within said storage means where a task when received by said storage means is always stored in an location which has the lowest address in said storage means and which is available to accept a task, said storage means comprises:

a queue having m stages, where each said stage has a unique address of 1 to m and stores (1) a task, (2) said unique address of a said receiver to receive said task and (3) a marker indicating when that said stored task has not yet been received by said receiver and that said stage is not available to accept a new task received by said storage means;

address means for generating for each system cycle a select address of one or more said receivers within a group of receivers; and priority means connected to said address means and said storage means for establishing priority among selected tasks, said selected tasks being those tasks for the receivers whose address compares with said selected addresses being generated by said address means and for generating a signal indicating which task of said selected tasks has priority, where said priority is established as a function of said selected tasks' position in said storage unit and the sequence said selected tasks were stored in said storage unit.

15. The apparatus of claim 14 wherein each of said stages includes:

match means for generating a match signal when said stage has stored therein both an unique address which compares with said select address generated by said address means and a marker;

priority match means for generating a priority match signal for a stage; and provide status means for generating a provide status signal for a stage when a match signal is generated for said stage and said stage has the highest priority.

16. The apparatus of claim 15 wherein each said stage of said match means comprises:

comparator means for generating a compare signal when said select address generated by said address means compares with designated portions of said unique receiver address stored in said stage.

17. The apparatus of claim 16 wherein each said match means further comprises:

match signal means for generating a match signal when said comparator means generates a compare signal and a marker is stored in said stage.

18. The apparatus of claim 15 wherein said priority match means comprises:

a priority latch; and priority match signal means for generating a priority match signal when said match means generates a match signal and said priority latch is set.

19. The apparatus of claim 18 wherein said priority match means further comprises:

setting means for setting the priority latch for a stage when no stage, having a higher stage address than said stage, generates a priority match signal, a match signal is generated by said stage and a provide status signal is not generated by said stage; and resetting means for resetting the priority latch for said stage when a provide status signal is generated by said stage.

20. The apparatus of claim 15 wherein said provide status means comprises:

provide status signal means for generating a provide status signal for said stage when either (1) a priority match signal is generated for said stage and no priority match signal is generated by any stage having a lower stage address than said stage or (2) when a match signal is generated by said stage, no match signal is generated by any stage having a lower address than said stage and no priority match signal is generated by any stage having a higher stage address than said stage.

* * * * *